(12) United States Patent
Larignon et al.

(10) Patent No.: US 10,321,301 B2
(45) Date of Patent: Jun. 11, 2019

(54) EUICC CARD MEMORIZING SHORT NUMBERS BY SUBSCRIBER PROFILE TO NOTIFY A SUBSCRIPTION MANAGEMENT SERVER

(71) Applicant: OBERTHUR TECHNOLOGIES, Colombes (FR)

(72) Inventors: Guillaume Larignon, Colombes (FR); Jerome Dumoulin, Colombes (FR)

(73) Assignee: IDEMIA France, Colombes (FR)

( * ) Notice: Subject to any disclaimer, the term of this patent is extended or adjusted under 35 U.S.C. 154(b) by 0 days.

(21) Appl. No.: 15/526,371

(22) PCT Filed: Nov. 10, 2015

(86) PCT No.: PCT/FR2015/053046
§ 371 (c)(1),
(2) Date: Jul. 7, 2017

(87) PCT Pub. No.: WO2016/075407
PCT Pub. Date: May 19, 2016

(65) Prior Publication Data
US 2017/0325084 A1  Nov. 9, 2017

(30) Foreign Application Priority Data

Nov. 14, 2014  (FR) ..................... 14 61031

(51) Int. Cl.
*H04W 4/00* (2018.01)
*H04W 8/18* (2009.01)
(Continued)

(52) U.S. Cl.
CPC .......... *H04W 8/183* (2013.01); *H04B 1/3816* (2013.01); *H04L 67/306* (2013.01);
(Continued)

(58) Field of Classification Search
CPC ......... H04W 8/183; H04W 4/60; H04W 4/14; H04W 60/005; H04W 88/06; H04W 8/205; H04B 1/3816; H04L 67/306
See application file for complete search history.

(56) References Cited

U.S. PATENT DOCUMENTS

2004/0229601 A1*  11/2004  Zabawskyj ........... H04W 76/15
                                                                 455/417
2005/0192007 A1*  9/2005  Kumar .................... H04W 8/06
                                                                 455/433
(Continued)

FOREIGN PATENT DOCUMENTS

| EP | 1 901 192 A1 | 3/2008 |
| EP | 2 680 628 A1 | 1/2014 |
| EP | 2 793 496 A1 | 10/2014 |

OTHER PUBLICATIONS

GSM Association, "Remote Provisioning Architecture for Embedded UICC", Technical Specification, Version 1.0, Dec. 17, 2013, XP055164432.

(Continued)

*Primary Examiner* — Barry W Taylor
(74) *Attorney, Agent, or Firm* — Young & Thompson

(57) ABSTRACT

The disclosure relates to the notification of an SM-SR subscription management server by an eUICC card or an eSE element. The card includes, in local memory, at least one short number (or "short code"), and more generally an address identifier, unique to a mobile-phone operator, wherein the number is associated with an operator subscriber profile within the secure card. The card is configured to retrieve, from the local memory, a short code associated with a subscriber profile in use to send, using the retrieved short code, a card status notification to the SM-SR server. In (Continued)

the absence of a short code, the card uses a unique international telephone number as the recipient of the notification.

14 Claims, 3 Drawing Sheets

(51) Int. Cl.
    *H04W 4/60*     (2018.01)
    *H04L 29/08*     (2006.01)
    *H04W 60/00*     (2009.01)
    *H04W 4/14*     (2009.01)
    *H04B 1/3816*     (2015.01)
    *H04W 88/06*     (2009.01)

(52) U.S. Cl.
    CPC .............. *H04W 4/14* (2013.01); *H04W 4/60* (2018.02); *H04W 60/005* (2013.01); *H04W 88/06* (2013.01)

(56) References Cited

U.S. PATENT DOCUMENTS

| | | | |
|---|---|---|---|
| 2014/0004827 A1* | 1/2014 | O'Leary | H04W 8/22 455/411 |
| 2016/0020803 A1* | 1/2016 | Cha | H04W 76/10 455/558 |
| 2016/0021529 A1* | 1/2016 | Park | H04W 12/08 455/410 |

OTHER PUBLICATIONS

CSMG, "Reprogrammable SIMs: Technology, Evolution and Implications Final Report", Sep. 25, 2012, XP055126567.
International Search Report, dated Feb. 2, 2016, from corresponding PCT application.

* cited by examiner

EUICC CARD MEMORIZING SHORT NUMBERS BY SUBSCRIBER PROFILE TO NOTIFY A SUBSCRIPTION MANAGEMENT SERVER

FIELD OF THE INVENTION

The invention relates generally to communications in a mobile telephone network, and notably status notifications in respect of secure cards or any other secure element to a secure routing unit of a remote subscriber management server (SM-SR unit).

The present invention is more particularly aimed at a secure element, for example a eUICC, at a mobile telephone infrastructure system and at a method of communication in a mobile telephone network.

These various elements can notably employ a short message service (SMS) to convey the status notifications in respect of the secure subscriber elements.

BACKGROUND OF THE INVENTION

A standard Universal Integrated Circuit Card (UICC), such as a SIM card, is a mobile telephone secure element defined in the ETSI TS 102 221 standard. It is customized by a telephone operator before being used by a subscriber. Embedded UICC (eUICC), or more generally embedded Secure Elements (eSE), are embedded in mobile telephone terminals and can contain a plurality of customized profiles, possibly for different operators.

eUICC or eSE proprietors are able to manage the eUICC or eSE of their subscribers remotely using a secure routing unit of a subscription management server (Subscription Manager-Secure Routing (SM-SR) server) included in the infrastructure of the mobile network. This remote management enables loading of data into the card or the element, for example, or changing of the mobile network and therefore of the mobile network operator.

According to the GSMA 12FAST.15 standard currently being drawn up, this remote management requires that the eUICC or eSE send notifications to the SM-SR server. These notifications can be sent using the short message service (SMS), hypertext transfer protocol secure (HTTPs), which is faster, or CAT-TP (faster).

For example, these notifications can confirm that the terminal is connected to the mobile network or that, because of a lack of coverage, the eUICC or eSE has switched to a profile other than the current profile, for example to a default profile.

According to this standard, a subscriber profile in an eUICC or an eSE is the combination of a structure comprising files, data and applications that enable the eUICC or eSE, when these elements are present, to access a particular mobile network infrastructure, notably that of a mobile network operator. A subscriber profile is thus specific to a mobile network operator in that it allows access only to the corresponding particular infrastructure. For example, the profile can include information on the entities of the infrastructure to be contacted, connection keys, etc. For example, an eUICC or an eSE can have two profiles associated with two different mobile operators, enabling access to different infrastructures. These profiles are managed by the issuer security domain-root (ISD-R of the GlobalPlatform standard) of the card, itself controlled by the mobile operator (the issuer).

To send a notification as referred to above, the eUICC or eSE must notably recover status data collected on the current profile, connection parameters and a destination address of the notification, i.e. the address of the SM-SR server that collects this information. In the case of a notification sent by SMS, the address of the SM-SR server is a unique international telephone number, i.e. one consisting of a country code allowing worldwide access to the SM-SR server (of the type +44 in the United Kingdom) and a telephone number within that country.

According to the same standard, the address of the SM-SR server is memorized in the eUICC or eSE by the proprietor of the SM-SR server using a particular command sent by the SM-SR server to the eUICC or eSE of the subscribers. This command "UpdateSMSRAdressingParameters" as defined in section 4.1.1.10 of the current version of the standard is sent to the ISD-R of the eUICC or eSE making it possible to update said address of the SM-SR server if necessary.

According to the standard as currently formulated, the SM-SR server should have an address (a unique international telephone number) that is unique for all the profiles and therefore accessible from all the mobile operators.

This situation of the standard is not satisfactory, however.

On the one hand, it is relatively difficult to use a unique international telephone number for all operators in all countries. In fact, in some cases, the networks filter binary SMS (SMS MO) coming from terminals. In this case one solution is to connect the SM-SR server to the short message service (SMS-C) server of each operator. However, access to the SM-SR server then no longer uses a unique telephone number.

On the other hand, a difficulty arises if the SM-SR server is changed and a new address is therefore allocated. Updating the eUICCs or eSEs then constitutes a heavy workload for the new SM-SR server, given the large number of subscribers impacted by this change.

Finally, the use of this kind of unique international telephone number type address does not enable easy processing of the notifications according to the operators. Moreover, it does not guarantee confidentiality of service notifications that an operator can trigger on the eUICCs or eSEs of its subscribers, because all the operators can manipulate the messages sent to a universal address.

In this context, the present invention aims to resolve some or all of these drawbacks.

SUMMARY OF THE INVENTION

The invention notably provides a secure element, for example a secure card, for connection to a mobile telephone network, comprising, in local memory, at least one address identifier, for example a short number (also known as a short code), the identifier being specific to a mobile network operator, said address identifier being associated with an operator's subscriber profile in the secure element, and the secure element is configured to recover from the local memory an address identifier, for example a short number, an IP address or a URL, associated with a subscriber profile being used and, using said recovered identifier, to send a secure element status notification to a remote service management (SM-SR) server in a mobile telephone infrastructure.

In a correlated manner, the invention provides a method of communication in a mobile telephone network using a secure element, for example a secure card, for connection to the mobile telephone network, the secure element comprising, in local memory, at least one address identifier, for example a short number, specific to a mobile network operator and associated with an operator's subscriber profile, the method comprising, on reception of an event triggering notification, the following steps:

recovering, from the local memory an address identifier, for example a short number, associated with a subscriber profile being used, and using the recovered identifier, sending a secure element status notification to a remote subscription management (SM-SR) server in a mobile telephone infrastructure.

The invention also provides a mobile telephone network infrastructure system comprising a subscription management (SM) server (including a secure routing (SR) unit) and comprising a plurality of subscriber terminals each equipped with a secure connection element, for example a secure card, as defined above for sending notifications to the subscription management server using an address identifier, for example a short number, specific to a mobile network operator.

The inventors have had the idea of using address identifiers, for example short numbers also known as short codes, to circumvent constraints linked to the updating of a new SM-SR server address and to the possibility of identifying the notifications according to the operators that the subscribers are subscribed to, in order to enable specific processing of those notifications.

Thanks to such identifiers or short numbers, each operator can easily manage (for example identify, filter, process, etc.) the notifications sent by its own subscribers because it receives those notifications on equipment units (for example SMS-C equipment units) specific to it (thanks to the identifier or the short number).

Other features of the secure element, the system and the method according to embodiments of the invention are defined in the dependent claims, essentially with the aid of device-specific terminology which can therefore be transposed to the method. Moreover, these features are mainly described with reference to a secure card and one or more short numbers. Of course, these features are also applicable to other types of secure elements and other address identifiers. In fact, the address identifier may comprise a short number unique to a mobile network operator (MNO) or an IP address specific to the operator or a URL address specific to the operator.

In one embodiment, the secure card comprises at least two short numbers each associated with a different subscriber profile, each short number enabling a notification to be sent to the subscription management (SM-SR) server when the associated subscriber profile is being used. Each mobile operator (via its subscriber profile or profiles) therefore has its own SM-SR server access short number.

In particular, the two short numbers can designate (i.e. define or identify the address of) the same SM-SR server accessible via two or more subscriber profiles, each according to a different notification path employing a particular short message service server (via a first SMS-C server or a second SMS-C server).

In one particular embodiment, the secure card comprises, in local memory, a correspondence table enabling association of each short number with each subscriber profile. This correspondence or where applicable routing table facilitates on the one hand the recovery of the short numbers by minimizing the consultation of the profiles and their modification (to include a number of this kind) and on the other hand the updating of the short numbers designating the SM-SR server by avoiding direct modification of the subscriber profiles.

According to one particular feature, the correspondence table memorizes each short number in association with a short number identifier or index, which index is memorized in a corresponding subscriber profile.

Alternatively, the correspondence table memorizes each short number in association with a subscriber profile identifier. This variant minimizes the modifications to be made to the profiles as defined in the current standard.

In a variant to the use of a correspondence table, each short number is memorized in the associated subscriber profile. This reduces the secure card memory occupancy.

In another embodiment the secure card further comprises a unique international telephone number of the remote subscription management (SM-SR) server, said secure card being configured to recover from the local memory said unique international telephone number when no short number is associated with a subscriber profile being used and to use said recovered unique international telephone number to send a card status notification to the remote subscription management (SM-SR) server. This feature defines the cohabitation of the unique international telephone number conventionally used with the short numbers provided by the invention. It therefore guarantees that the standard notification function of the SM-SR server is used a minima when no short number is available for the subscriber profile being used, notably when the associated mobile operator has not defined any.

In another embodiment, the secure card is configured:

to receive from the remote subscription management (SM-SR) server a command to update an address of the remote server in the local memory of the secure element, the update command including a unique international telephone number of the remote server and/or at least one short number, associated with a subscriber profile and designating the remote server, and to update (i.e. to memorize if no information has already been memorized), in the local memory of the secure element and in response to the update command, the unique international telephone number of the remote server and/or the at least one short number in association with a subscriber profile as indicated in the update command, so as to notify the subscription management server using the updated numbers.

Note that the short numbers are generally unique within the mobile network of the same operator (MNO), sometimes within the same country, but rarely worldwide. Short numbers of this kind valid in more than one country are notably available at prohibitive cost. A result of this is that the same SM-SR server on which a plurality of mobile operators are dependent is, according to the invention, associated with a plurality of short numbers, each corresponding to a different mobile operator. Now, the GSMA 12FAST.15 standard referred to above cannot address this kind of situation because the address of the SM-SR server must be unique.

In this context, according to one particular embodiment, the update command is similar to the "UpdateSMSRAdressingParameters" command defined in section 4.1.1.10 of the GSMA 12FAST.15 standard, augmented by at least one double-field associating a short number with a subscriber profile identifier. The double-field can notably be repeated a plurality of times in the command in order to define a plurality of short numbers for a corresponding plurality of subscriber profiles.

In one embodiment, the infrastructure system further comprises a short message service (SMS-C) server specific to a mobile network operator, the short message service server comprising, in local memory, a table of correspondences between a short number that is specific to said mobile network operator and an IP address of the remote subscription management (SM-SR) server. The SMS-C server is used when the status notifications are sent by the secure card in the form of SMS messages. The correspondence table provided in this server then enables the operator to route these messages to the SM-SR server efficiently. In fact, the SMS-C and SM-SR servers generally communicate using the Internet Protocol (IP), in contrast to equipment units located upstream of the SMS-C server.

In one particular embodiment, the infrastructure system comprises a plurality of short message service (SMS-C) servers associated with a plurality of respective mobile network operators, the short message service servers each comprising in local memory a table of correspondences between a short number that is specific to the associated operator and the same remote subscription management (SM-SR) server. The mobile network operators can therefore share the costs of the same SM-SR server while having great freedom to process status notifications sent by their subscribers. In fact, thanks to the use of the short numbers, the messages sent are received by an SMS-C server specific to the appropriate mobile operator. The latter can then easily carry out any appropriate processing of the received messages.

In one embodiment, the remote subscription management (SM-SR) server is configured to send a command to update an address of the remote server, the update command including a unique international telephone number of the remote server and/or at least one short number associated with a subscriber profile and designating the remote server, so as to update, in the memory of the secure cards, the unique international telephone number of the remote server and/or the at least one short number in association with a subscriber profile as indicated in the update command. The update command can be as defined above, notably on the basis of the "UpdateSMSRAdressingParameters" command defined in section 4.1.1.10 of the GSMA 12FAST.15 standard.

The advantages, aims and particular features of this device, this computer program and this information medium being similar to those of the method that is the subject matter of the present invention, they are not repeated here.

BRIEF DESCRIPTION OF THE FIGURES

Other advantages, objects and particular features of the present invention emerge from the following description given by way of non-limiting explanation only and with reference to the appended drawings, in which.

DETAILED DESCRIPTION OF THE INVENTION

Figure 1:
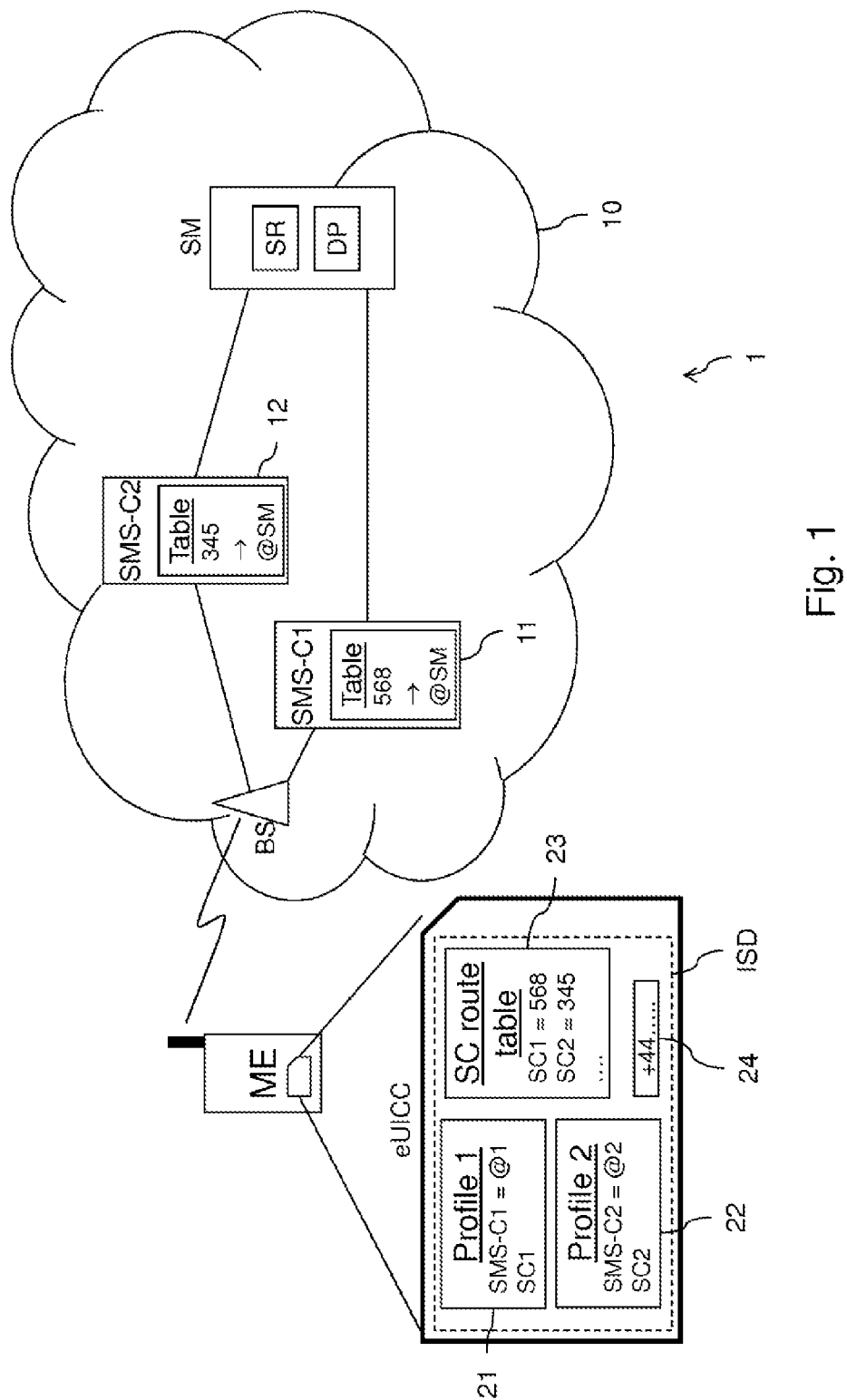
FIG. 1 is a simplified illustration of one example of a mobile telephone network in which embodiments of the present invention can be used.

FIG. 1 is a simplified representation of one example of a mobile telephone network in which embodiments of the present invention can be used. In this diagrammatic representation, only one mobile terminal ME with an embedded secure eUICC is shown. Of course, a mobile telephone network generally includes a plurality of mobile terminals of this kind equipped with eUICC (or SIM, USIM) cards. The present description considers eUICC by way of example. Generally speaking, the present invention can be used in any type of secure element (see the aforementioned standard), for example embedded secure elements or eSE.

The system 1 shown therefore comprises a standard mobile terminal ME, i.e. one provided with means for communication over the mobile network and embedding a secure subscriber card of eUICC type. The present invention implements particular operations in the secure eUICC.

The system 1 also comprises a mobile network 10 conventionally comprising base stations BS for connecting the mobile terminals ME, a plurality of entities (GMSC gateway, HLR, MSC, VLR servers, etc. not shown) including short message service servers SMS-C1 and SMS-C2 and a subscription management server SM equipped with a secure routing unit SR and a data preparation unit DP.

The two servers SMS-C1 and SMS-C2 are managed by two different mobile network operators MNO1 and MNO2, respectively. Of course, the present invention applies when the system 1 comprises a greater number of short message service servers managed by two or more operators.

Similarly, in this example the server SM-SR is shared between the two operators MNO1 and MNO2 in order to reduce installation, deployment, operating and maintenance costs. Of course, there may be other SM-SR servers, shared between a plurality of operators MNO.

As shown in the figure, and as known from the GlobalPlatform standard, the secure eUICC comprises, in memory, an issuer security domain (here the issuer is an MNO) managing a plurality of subscriber profiles 21, 22, a correspondence table 23 and a universal address 24 of the server SM-SR, notably a unique international telephone number of that server.

The subscriber profiles may be profiles of different operators (for example MNO1 and MNO2) providing access to their corresponding infrastructures or profiles providing access to different infrastructures of the same MNO (for example a 3G infrastructure and a 4G infrastructure). In known manner, only one profile is active, i.e. being used, at a time. The selection of a profile or switching from one profile to another can be triggered automatically, in a manner controlled by the MNO using service messages, or manually by the user (for example by changing operator or 3G or 4G technology).

In addition to the information conventionally memorized in a profile (see the GSMA 12FAST.15 standard), each profile 21, 22 memorizes the address of a corresponding SMS-C server (in this example the two profiles memorize the addresses @1 and @2 of the servers SMS-C1 and SMS-C2, respectively) and stores an index, SC1 for the profile 21 and SC2 for the profile 22.

For its part, the correspondence table 23 here associates each index used with an address identifier. That address identifier may comprise or consist of an effective short number unique to a mobile network operator. In known manner, a short number is a special telephone number substantially shorter than conventional telephone numbers. A short number conventionally comprises between 4 and 8 digits.

In this example, the index SC1 is associated with the short number 568 and the index SC2 is associated with the short number 345. Alternatively, the address identifier can be an IP address specific to the operator, typically formed of 15 characters maximum (for example SC1=78.123.2.23). Another alternative is for the address identifier to consist of a URL specific to the operator, for example formed of 256 characters maximum (for example SC1=www.smsr1.com).

The correspondence table 23 therefore enables each address identifier, for example each short number, to be associated with a subscriber profile.

The remainder of this description refers mainly to short numbers to simplify the explanations. Of course, the invention applies to any type of address identifier formed of alphanumeric characters including special characters. Thus for example SC1=568 or SC1=78.123.2.23 or SC1=www.smsr1.com are used, as appropriate.

In the embodiment shown in the figure, the eUICC therefore memorizes a plurality of numbers identifying the server SM-SR and enabling it to send status notifications in respect of the card.

To this end, the card is able to recover from the local memory one of the short numbers, namely that which is associated with the subscriber profile being used, if that short number exists. Otherwise, the card conventionally retrieves the universal address 24 corresponding to the server SM-SR.

Then, using the short number or the unique international telephone number it has retrieved, the card sends a card status notification to the server SM-SR.

As emerges from the examples given hereinafter, this notification can take the form of an SMS message transmitted to the server SMS-C corresponding to the active profile (i.e. to the server SMS-C indicated in said active profile).

As shown in the figure, each server SMS-C holds in memory a table (11, 12) of correspondences between a short number (or any address identifier) that is unique to the operator associated with the server SMS-C concerned (MNO1 for SMS-C1 and MNO2 for SMS-C2) and the same server SM-SR, notably an IP (Internet Protocol) address of that server SM-SR.

The server SMS-C that receives an SMS message from the eUICC, which message comprises the status data to be transmitted and the short number designating the server SM-SR, therefore converts the message it has received into an IP message to be sent to the address of the server SM-SR as associated with the short number received in the table 11 or 12. Note that when the address identifier is an IP address, this may be the IP address of the server SM-SR or any other IP address that is associated in the correspondence table with the IP address of the server SM-SR.

The server SM-SR processes the messages (notifications) received in this way in the conventional way.

Figure 2:
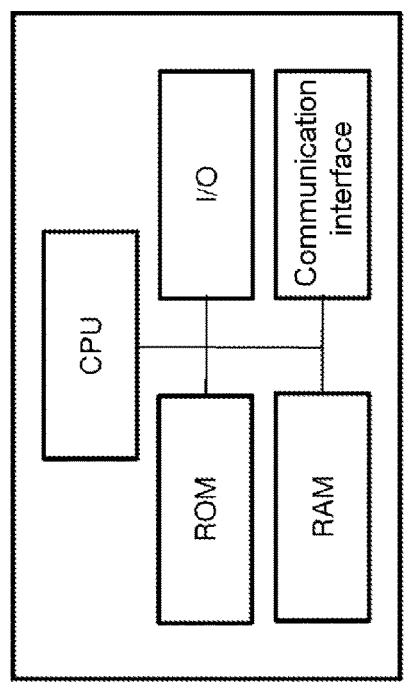
FIG. 2 shows a hardware architecture example for the equipment or equipments constituting the system 1 described with reference to FIG. 1.

FIG. 2 shows an example of a hardware architecture for the equipment unit or units constituting the system 1 described with reference to FIG. 1.

In this example, the equipment, secure element, eUICC, terminal ME, server SMS-C or server SM-SR, comprises a communication bus to which are connected:

- a central processing unit (CPU) or microprocessor;
- one or more non-volatile memories, for example read-only memories (ROM) adapted to constitute a medium in the sense of the invention, i.e. able to contain a computer program comprising instructions for executing a method according to one embodiment of the invention; this non-volatile memory can also be an electrically erasable read only memory (EEPROM) or a Flash memory;
- a random access memory RAM or cache memory or volatile memory comprising registers adapted to store variables and parameters created and modified during the execution of the aforementioned program; when the invention is used, the instruction codes of the program stored in the read-only memory ROM are loaded into the random-access memory RAM in order to be executed by the central processing unit CPU;
- a communication interface adapted to transmit and to receive data, for example via a telecommunication network or a read/write interface of a secure element;
- an input/output (I/O) interface, for example a screen, a keyboard, a mouse or some other pointing device such as a touch-sensitive screen or a remote control; this I/O interface enables the user to interact with the system when using the method via a graphical user interface.

The communication bus enables communication and interoperability between the various elements included in or connected to the equipment. The representation of the bus is not limiting on the invention and in particular the central processing unit is able to communicate instructions to any element of the equipment either directly or via another element of that equipment.

Figure 3:
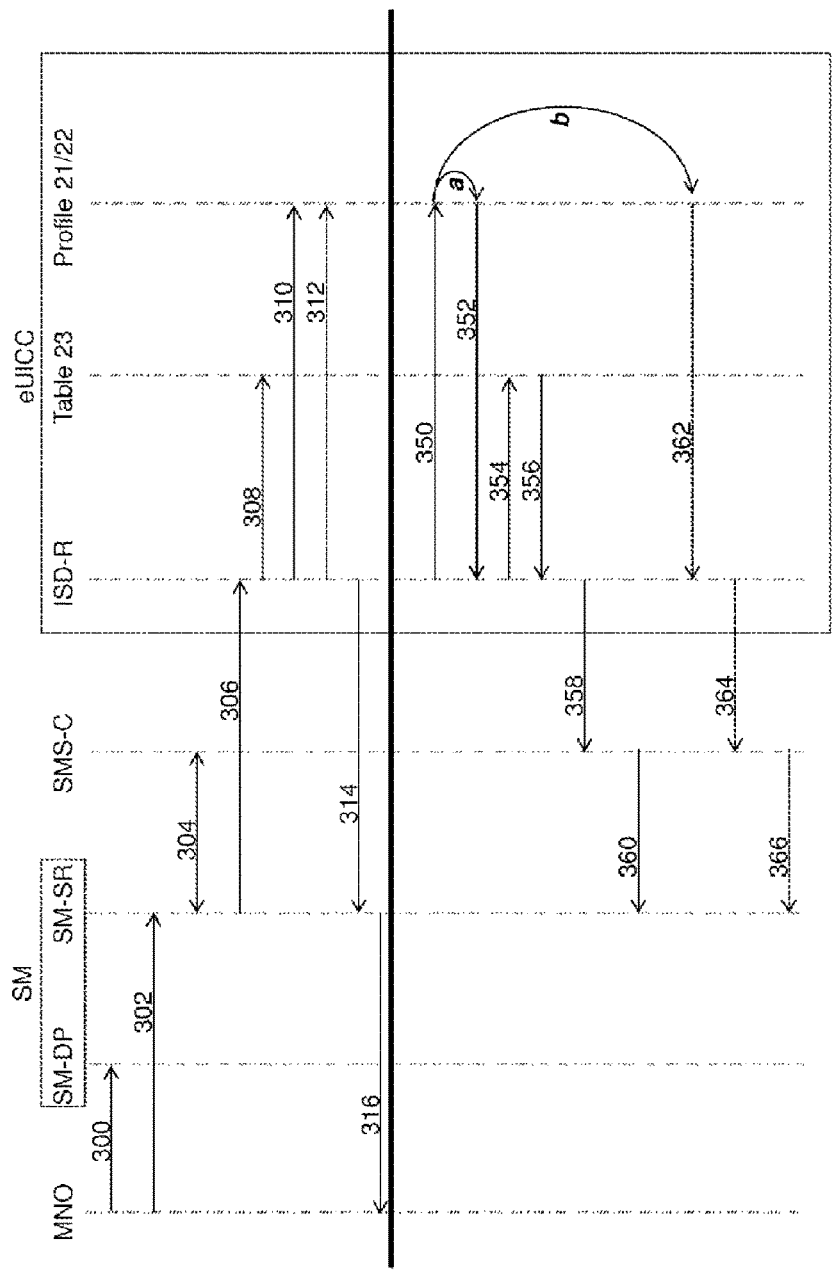
FIG. 3 shows the use of the invention for the configuration of subscriber eUICC and the communication of notifications from those cards to the SM-SR server from FIG. 1.

FIG. 3 shows an embodiment of the invention for configuring the eUICC of subscribers and the communication of notifications from those cards to the server SM-SR. The entities of the eUICC are represented in the right-hand part of the figure, inside a dashed line frame headed "eUICC". The elements shown in the left-hand part of the figure concern the elements of the mobile network 10.

The first phase of configuring or updating the eUICC, or more generally any secure element according to the invention, is illustrated by the upper part of the figure (above the thick line). It enables the short numbers, or more generally the address identifiers, to be memorized in the eUICC in association with subscriber profiles.

In steps 300 and 302, a mobile network operator MNO adds information relating to the short numbers SC to the data preparation unit DP and the secure routing unit (SR) units of the subscriber management server SM.

In step 300, it sends a command Add(SC, profile type) to the unit DP of the server SM (i.e. the unit SM-DP) so as to associate the short number SC, or more generally the address identifier SC, with the profile or profiles identified by profile type. For example, the new short number SC is associated with the 4G technology-based profile or profiles. The SM-DP unit is responsible for creating and maintaining the various profiles created by the operator or operators sharing the server SM.

In step 302, it sends (step 306) a command Add(SC, SMS-C) to the unit SR of the server SM (i.e. the unit SM-SR) which updates all of the addressing and routing information in the network. The SM-SR unit can therefore broadcast (synchronization between the servers during the step 304) the new short number SC to the appropriate server SMS-C in order for the latter to associate it with the IP address of the server SM (or the unit SM-SR sending the message enabling this broadcasting).

As a result, all the new short numbers created by an MNO are known to the server SM and are broadcast to the various servers of the network 10.

Then, in order to broadcast these new short numbers to the eUICC of the subscribers, the unit SM-SR sends an update command to an address of the secure routing unit, in this instance a new short number.

The update command includes a unique international telephone number of the secure routing unit in the conventional case of the command "UpdateSMSRAdressingParameters" defined in section 4.1.1.10 of the GSMA 12FAST.15 standard (see the field "SMS Parameter Value" in the example below).

The command can also comprise (the section relating to the unique international telephone number may be empty if that number remains unchanged) at least one short number associated with a subscriber profile and designating the secure routing unit.

This command can be based on the aforementioned command "UpdateSMSRAdressingParameters" by adding to it at least one double-field associating a short number, or more generally an address identifier SC, with a subscriber profile identifier. Of course, the double-field is repeated as many times as necessary to define all of the {short number-profile identifier} combinations that it is necessary to broadcast to the eUICC.

In one embodiment the command "UpdateSMSRAdressingParameters" defined in section 4.1.1.10 of the GSMA 12FAST.15 standard is modified as follows (the fields underlined in boldface type are added compared to the standard):

| Code | Value | Meaning | Presence |
|---|---|---|---|
| DGI | 'DF6D' | Proprietor DGI for the card | Mandatory |
| Length | xx | Length of following data | Mandatory |
| Command | 10 | Command updating SM-SR address parameters | Mandatory |
| SMS Parameter Tag | 'A3' | SMS parameter tag | Conditional |
| SMS Parameter Length | X | SMS parameter length | Conditional |
| SMS Parameter Value | xx ... xx | SM-SR destination address | Conditional |
| CAT-TP Parameter Tag | 'A4' | CAT-TP parameter tag | Conditional |
| CAT-TP Parameter Length | Y | CAT-TP parameter length | Conditional |
| CAT-TP Parameter Value | xx ... xx | CAT-TP link parameter value | Conditional |
| SC Parameter Tag | 'E3' | SC parameter tag | Conditional |
| SC Parameter Length | X + Y + 4 | SC parameter length | Conditional |
| SC Value Tag | 91 | SC tag | Conditional |
| SC Value Length | X | SC length | Conditional |
| SC Value value | xx ... xx | SC value | Conditional |
| Profile ID Tag | "01" | Profile tag | Conditional |
| Profile ID Length | Y | Profile identifier length | Conditional |
| Profile ID Length | xx ... xx | Profile identifier value | Conditional |

Command "UpdateSMSRAdressingParameters" Modified According to One Embodiment of the Invention The fields "SC Value Length" and "SC Value value" enable management of short numbers that vary in size from one country to another, or more generally address identifiers in which the number of characters can fluctuate.

On receiving a command of this kind, each eUICC can therefore update (or memorize if no information has yet been memorized) in its local memory and in response to the update command, the unique international telephone number of the secure routing unit and/or the at least one short number in associated with a subscriber profile as indicated in the update command. As a result, the eUICC can notify the secure routing unit of the subscription management server using the updated numbers.

This actual updating is illustrated in the figure by the steps 308 and 310.

In step 308, the issuer security domain root (ISD-R) of the card receives and executes the update command. In fact, only this ISD-R domain is known to the server SM as a gateway into the eUICC. The unit SM-SR therefore sends the update command to the ISD-R.

Still in step 308, in response to the execution of this command, the ISD-R sends a command to update the correspondence table 23 with the new short number or numbers indicated in the command, for example using the command STORE in which the short numbers are included as parameters (with either a profile identifier or an SC index).

For example, it may be a question of storing the short number '345', with which the correspondence table associates the index SC2 (first available index, for example).

In step 310, if the correspondence table 23 associates an SC index with each new short number, the ISD-R links the new short numbers to the subscriber profiles as specified in the command received, in particular the already existing profiles. For example, the ISD-R can modify each subscriber profile concerned to memorize the SC index associated with the corresponding short code number (as memorized in the table 23), using a Link SC command. In this example, the profile 2 (22 in FIG. 1) is modified to memorize the index SC2.

Note that if a short number has already been supplied for a given profile, the command indicating a new short number for the same profile leads to the elimination and replacement of the old short number to the benefit of the new one.

Note that in a variant of the invention that does not use a correspondence table 23, each short number, or more generally each address identifier, is memorized in the associated subscriber profile. To this end, the ISD-R generates a command modifying the profile directly, for example STORE SC in the profile (step 312).

Once the eUICC has been configured, the ISD-R sends an acknowledgement to the server SM-SR (step 314) which in turn informs the MNO (step 316).

Subsequently the eUICC, or more generally the secure element, wishes to send a notification to the server SM-SR. This is described hereinafter starting from the step 350, for one embodiment of the invention. At this stage, the eUICC is connected to a mobile telephone network using one of the profiles available on the card (that profile then being active, i.e. being used, and indicated as enabled in the registers in the ISD-R). For example, the active profile is the profile 2 (22 in FIG. 1).

A number of trigger events can trigger step 350.

These are mainly events internal to the eUICC such as a connection to a mobile network, a change of location (for example of radio cell), a first activation of the subscriber card, an error (for example an impossible network connection) leading to switching over to a default or "fallback" profile.

Of course, events relating to the SIM Toolkit tools can be taken into account, for example events resulting from the user interacting with SIM Toolkit interfaces (menus).

Alternatively, a triggering event could be the reception of a particular command from the server SM-SR.

On detection of said triggering event, the ISD-R sends a command to retrieve an address from the server SM-SR. This is the step 350 in which the ISD-R sends the command GET, for example, to retrieve in the active profile the index of a short number, or more generally of an address identifier, associated with the active subscriber profile, if such a number exists (situation a in the figure). The short number is therefore preferably used rather than the unique international telephone number 24.

In response to this command, the SC index is retrieved during step 352. In the present example, the index 'SC2' is retrieved because profile 2 is active.

During the steps 350 and 352, the ISD-R regularly retrieves the address of the server SMS-C associated with the active profile, the address @2 of the server SMS-C2 in this example.

The ISD-R then retrieves the short number associated with this index in the correspondence table 23: command GET SC in step 354 and response in step 356. In the FIG. 1 example, the index 'SC2' enables the short number '345' to be retrieved.

Note that when the correspondence table 23 associates the short number of the server SM-SR directly with a subscriber profile identifier, steps 350 and 356 can consist in retrieving the address of the server SMS-C at the level of the active profile and retrieving a short number associated with the active profile identifier (known to the ISD-R) exclusively at the level of the correspondence table 23.

Knowing the short number (if there is one), the ISD-R prepares and sends a status notification message in respect of the card in step 358.

This message takes the form of an SMS message sent to the server SMS-C (the address @1 or @2 of which was retrieved in step 352), and this message comprises:
  the status data in respect of the eUICC; and
  the address of the server SM-SR, either the retrieved short number '345', in particular indicated in the field TP-DA (Destination Address) of the SMS notification.

For example, the aforementioned GSMA standard defines different types of notifications:
  value '01' on first connection to the network;
  value '02' if profile change succeeds;
  value '03' if profile change fails and Rollback;
  value '04' if profile change fails and Fallback to a fallback profile;
  value '05' if profile changed after local fallback to a Fallback profile.

This notification message is received by the server SMS-C (the server SMS-C2 in this example) which: (1) determines in its local table 11/12 the IP address of the server SM-SR corresponding to the short number indicated in the received SMS message (for example the IP address 78.123.2.23 associated with '345' in that table), and (2) forwards the status data (notification) to the server SM-SR in the form of an IP message to the IP address 78.123.2.23 obtained. This is step 360.

Steps 362 to 366 illustrate the situation in which no short number is associated with the active subscriber profile (case b in the figure). In this case, in response to the command 350, only the unique international telephone number 24 is returned to the ISD-R. This number is specified in the SMS message transmitted in step 364 (similar to step 358) enabling the SMS-C server to determine the IP address of the server SM-SR for forwarding the status data (notification) in the form of IP packets (step 366).

The foregoing examples are merely embodiments of the invention, which is not limited to them.

The invention claimed is:

1. A secure element for connection to a mobile telephone network (10), comprising, in local memory, two short numbers denoting the same remote subscription management server in a mobile network infrastructure for two respective mobile network operators, each short number being specific to one of the mobile network operators and being associated with a different operator subscriber profile (21, 22) in the secure element, and wherein said secure element is configured to recover from the local memory the short number associated with a subscriber profile being used and, to send an SMS message to said recovered short number, said SMS message including a secure element status notification, thus allowing transmission of said secure element status notification to the remote subscription management server via a short message service SMS-C server specific to the mobile network operator associated with the recovered short number.

2. The secure element as claimed in claim 1, comprising, in local memory, a correspondence table (23) enabling association of each short number with each subscriber profile.

3. The secure element as claimed in claim 2, in which the correspondence table (23) memorizes each short number in association with an index, which index is memorized in a corresponding subscriber profile.

4. The secure element as claimed in claim 2, in which the correspondence table (23) memorizes each short number in association with the subscriber profile identifier.

5. The secure element as claimed in claim 1, in which each short number is memorized in the associated subscriber profile.

6. The secure element as claimed in claim 1, further comprising a unique international telephone number (24) of the remote subscription management server, said secure element being configured to recover said unique international telephone number from the local memory when no short number is associated with a subscriber profile being used and, using said recovered unique international telephone number, to send a secure element status notification to the remote subscription management server.

7. The secure element as claimed in claim 1, configured:
  to receive from the remote subscription management server a command to update an address of the remote server in the local memory of the secure element, the update command including a unique international telephone number (24) of the secure routing unit and/or at least one short number, associated with a subscriber profile (21, 22) and designating the remote server, and
  to update, in the local memory of the secure element and in response to the update command, the unique international telephone number of the remote server and/or the at least one short number in association with a subscriber profile as indicated in the update command, so as to notify the subscription management server using the updated numbers.

8. The secure element as claimed in claim 7, in which the update command is similar to the "UpdateSMSRAdressingParameters" command defined in section 4.1.1.10 of the GSMA 12FAST.15 standard, version 1.0 as of 17 Dec. 2013, augmented by at least one double-field associating a short number with a subscriber profile identifier.

9. The secure element as claimed in claim 1, of secure card type.

10. A mobile telephone network infrastructure system comprising a subscription management server and comprising a plurality of subscriber terminals each equipped with a secure connection element as claimed in claim 1 for sending notifications to the subscription management server using an short number, the short number being specific to a mobile network operator.

11. The system as claimed in claim 10, in which the remote subscription management server is configured to send a command to update an address of the remote server, the update command including a unique international telephone number of the remote server and/or at least one short number associated with a subscriber profile and designating the remote server, so as to update, in the memory of the secure elements, the unique international telephone number of the remote server and/or the at least one short number in association with a subscription profile as indicated in the update command.

12. The system as claimed in claim 10, further comprising two short message service SMS-C servers specific to two mobile network operators respectively, each short message service server comprising, in local memory, a table (11, 12) of correspondences between a short number, that is specific to said mobile network operator and an IP address of the same remote subscription management server.

13. A method of communication in a mobile telephone network (10) executed by a secure element for connection to the mobile telephone network, the secure element comprising, in local memory, two short numbers denoting the same remote subscription management server in a mobile network infrastructure for two respective mobile network operators, each short number being specific to one of the mobile network operators and associated with a different operator subscriber profile (21, 22), the method comprising, on reception of an event triggering notification, the following steps:

recovering (350, 352), from the local memory the short number associated with a subscriber profile being used, and sending (358) an SMS message to said recovered short number, said SMS message including a secure element status notification, thus allowing transmission of said secure element status notification to the remote subscription management server via a short message service SMS-C server specific to the mobile network operator associated with the recovered short number.

14. The method as claimed in claim 13, in which the secure element receives (306) from the subscription management remote server a command to update an address of the remote server, the update command including an unique international telephone number (24) of the remote server and/or at least one a short number, associated with a subscriber profile (21, 22) and designating the remote server, and updates (308, 310, 312), in its local memory and in response to the update command, the unique international telephone number of the remote server and/or the at least one short number in association with a subscriber profile as indicated in the update command, so as to notify the subscription management server using the updated numbers.

* * * * *